United States Patent
Santoso et al.

(10) Patent No.: US 7,561,957 B1
(45) Date of Patent: Jul. 14, 2009

(54) SPARK-IGNITION DIRECT-INJECTION COLD START STRATEGY USING HIGH PRESSURE START

(75) Inventors: Halim G. Santoso, Novi, MI (US); Frank Ament, Troy, MI (US); Donovan L. Dibble, Utica, MI (US)

(73) Assignee: GM Global Technology Operations, Inc.

( * ) Notice: Subject to any disclaimer, the term of this patent is extended or adjusted under 35 U.S.C. 154(b) by 0 days.

(21) Appl. No.: 12/100,580

(22) Filed: Apr. 10, 2008

Related U.S. Application Data

(60) Provisional application No. 61/031,791, filed on Feb. 27, 2008.

(51) Int. Cl.
*F02D 13/02* (2006.01)
*G06F 19/00* (2006.01)

(52) U.S. Cl. .................................. 701/113

(58) Field of Classification Search ......... 701/112–113, 701/115; 123/179.15, 119.17, 491, 90.15, 123/90.17
See application file for complete search history.

(56) References Cited

U.S. PATENT DOCUMENTS

| 4,200,079 | A  | * | 4/1980  | Darlington | ............. | 123/179.16 |
| 4,867,115 | A  | * | 9/1989  | Henein     | .................. | 123/179.17 |
| 6,431,143 | B1 | * | 8/2002  | Pratt et al. | .................. | 123/383    |
| 7,142,973 | B2 | * | 11/2006 | Ando       | ........................ | 701/112    |

FOREIGN PATENT DOCUMENTS

JP    2004-278324  A  * 10/2004

* cited by examiner

*Primary Examiner*—Hieu T Vo
(74) *Attorney, Agent, or Firm*—Harness, Dickey & Pierce, P.L.C.

(57) ABSTRACT

An engine control system for a spark-ignition direct-injection (SIDI) engine comprises a fuel control module delays injection of fuel during engine cranking until fuel pressure is greater than a predetermined fuel pressure, retards ignition timing, and retards fuel injection until near top dead center (TDC). An exhaust cam phaser module retards an exhaust cam phaser after starting and oil pressure is greater than a predetermined oil pressure.

20 Claims, 4 Drawing Sheets

SPARK-IGNITION DIRECT-INJECTION COLD START STRATEGY USING HIGH PRESSURE START

CROSS-REFERENCE TO RELATED APPLICATIONS

This application claims the benefit of U.S. Provisional Application No. 61/031,791, filed on Feb. 27, 2008. The disclosure of the above application is incorporated herein by reference.

FIELD

The present disclosure relates to spark-ignition direct-injection (SIDI) engines, and more particularly to engine control systems for SIDI engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Spark-ignition direct-injection (SIDI) engines include one or more fuel injectors that inject fuel directly into corresponding engine cylinders. A fuel pump supplies fuel to a fuel rail at high pressure, for example 3-15 M Pascals (Pa). The fuel rail provides the pressurized fuel to the fuel injectors. The fuel injectors inject the fuel into the cylinders at times and pulse widths that are determined by an engine control module.

SUMMARY

An engine control system for a spark-ignition direct-injection (SIDI) engine comprises an engine starting module that detects engine cranking and starting. A fuel control module delays injection of fuel during engine cranking until fuel pressure is greater than a predetermined fuel pressure, retards ignition timing during engine cranking and retards fuel injection until near top dead center (TDC). An exhaust cam phaser module retards an exhaust cam phaser after starting and oil pressure is greater than a predetermined oil pressure.

A method for controlling a spark-ignition direct-injection (SIDI) engine comprises detecting engine cranking and starting; delaying injection of fuel during engine cranking until fuel pressure is greater than a predetermined fuel pressure; retarding ignition timing during engine cranking; retarding fuel injection until near top dead center (TDC); and retarding an exhaust cam phaser after engine starting and oil pressure is greater than a predetermined oil pressure.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
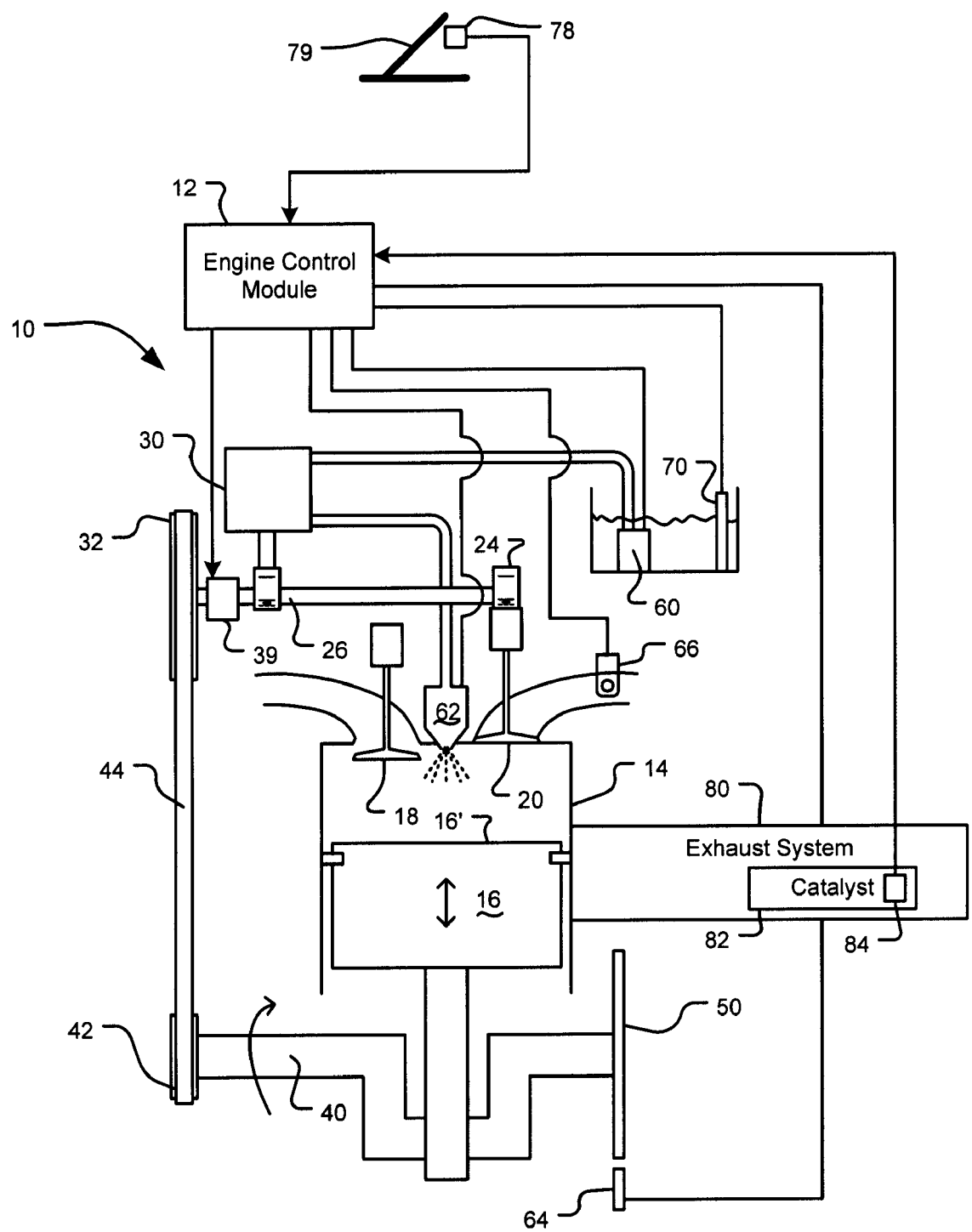
FIG. 1 is a functional block diagram of a spark-ignition direct-injection SIDI engine and associated engine control module according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The present disclosure reduces emissions of vehicles with SIDI engines. For example only, the engine control systems and methods disclosed herein may be used on a vehicle with the SIDI engine to help meet Super Ultra Low Emission Vehicle (SULEV) requirements. Currently, some manufacturers use secondary air pumps to meet the SULEV emission requirements. The present disclosure enables vehicles with SIDI engines to meet more stringent emission standards without a secondary air pump, which may reduce exhaust after treatment costs.

In conventional SIDI engine control systems, fuel pressure during a cold start may be relatively low. For example only, fuel pressure may be approximately 0.4 M Pascals (Pa) during cold starts. The relatively low pressure may be due to the fact that the fuel pump has not had an opportunity to build up fuel pressure in the fuel rail. Attempting to start the engine with the relatively low fuel pressure limits when the fuel may be injected and may tend to increase HC emissions.

The present disclosure uses high pressure fuel during engine cranking. By using higher pressure fuel, the present disclosure retards or delays fuel injection to near top dead center (TDC). The present disclosure also retards an exhaust cam phaser after oil pressure exceeds a predetermined threshold. The high fuel pressure enables injection of fuel near piston TDC. For example only, near TDC may be between 60 degrees before TDC to 0 degrees before TDC.

Referring now to FIG. 1, a functional block diagram is shown of a spark-ignition direct-injection (SIDI) engine 10 and an associated engine control module 12. Engine 10 includes a cylinder 14 that contains a reciprocating piston 16. An intake valve 18 opens periodically to allow intake air into cylinder 14. An exhaust valve 20 opens periodically to allow exhaust gas to escape from cylinder 14.

Opening and closing of exhaust valve 20 is controlled by exhaust cam lobe 24. Exhaust cam lobe 24 rotates with a camshaft 26. Camshaft 26 may also include a lobe that drives a mechanical fuel pump 30. It should be appreciated that fuel pump 30 may also be gear driven, belt driven or electric. A camshaft pulley 32 drives camshaft 26.

Reciprocating piston 16 drives a crankshaft 40. In addition, the angular position of the camshaft 26 may be adjusted relative to the crankshaft by an exhaust cam phaser 39. The intake valves 18 may be opened, closed and adjusted in a similar manner. A crankshaft gear 42 rotates with crankshaft 40. Crankshaft gear 42 drives camshaft pulley 32 via a belt or chain 44. In some embodiments the belt or chain 44 may be replaced with gears. A crankshaft position target ring 50 is also attached to crankshaft 40.

Engine control module 12 generates output signals that control an electric fuel pump 60 and a fuel injector 62. A crankshaft position sensor 64 generates a crank position signal based on a position of crankshaft position target ring 50. Crankshaft position sensor 64 communicates the signal to engine control module 12.

Engine control module 12 may also receive one or more signals from at least one of a fuel/air or lambda sensor 66 and a fuel tank level sensor 70. Lamba sensor 66 indicates the oxygen content of the engine exhaust. Fuel tank level sensor 70 indicates the quantity of fuel in the vehicle fuel tank. Fuel injector 62 atomizes the fuel directly into the combustion chamber of cylinder 14. Intake valve 18 opens during the intake stroke to allow combustion air into the combustion chamber.

An accelerator pedal position sensor 78 senses a position of the accelerator pedal 79. An exhaust system 80 receives exhaust gas from the engine. The exhaust system 80 may include a catalyst 82. A temperature sensor 84 senses a temperature of the catalyst 82. Alternately, the control module may estimate the temperature of the catalyst based on engine operating parameters.

Figure 2:
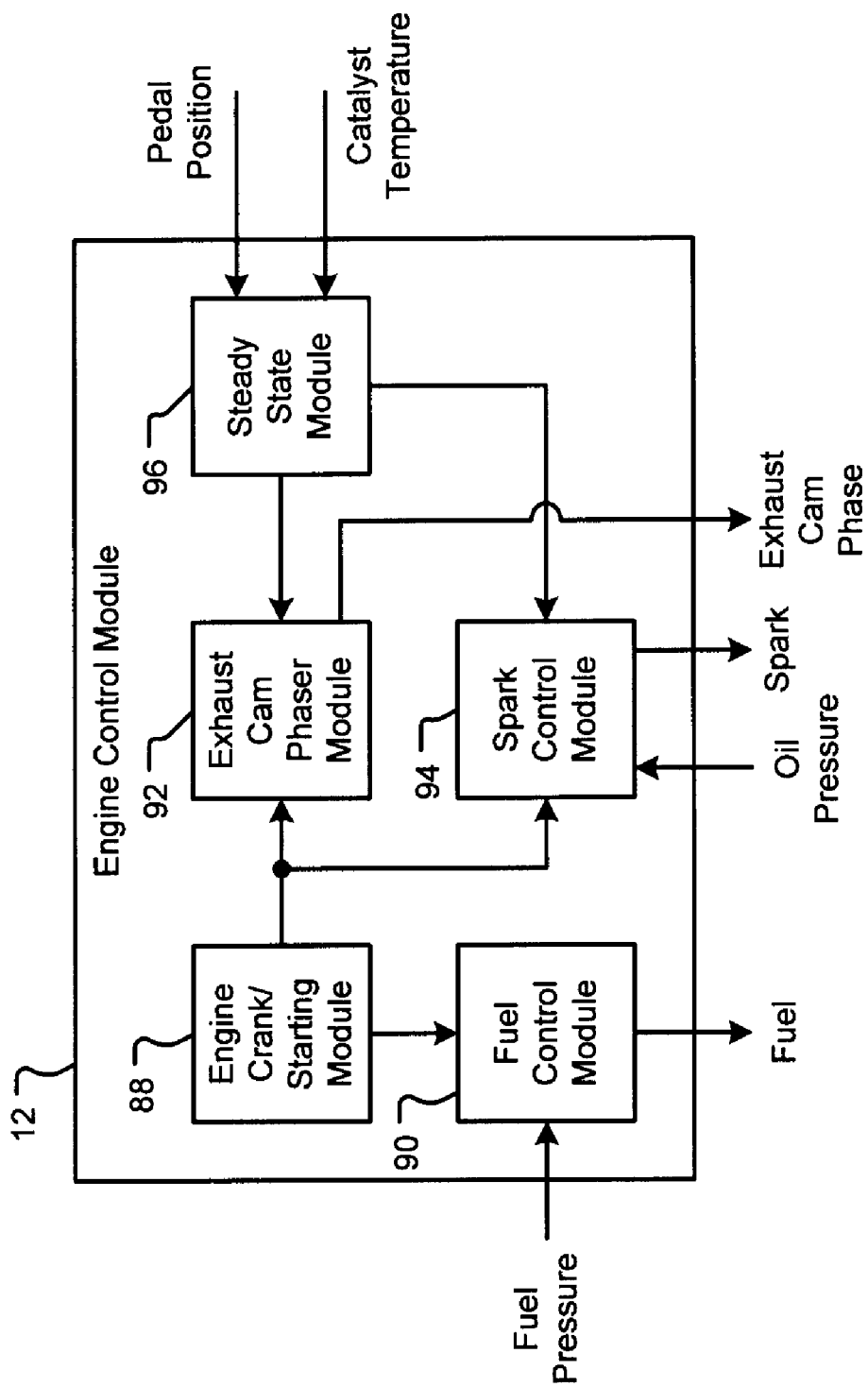
FIG. 2 illustrates an exemplary engine control module according to the present disclosure.

Referring now to FIG. 2, the engine control module 12 may include an engine cranking/starting module 88 that detects engine cranking and starting. A fuel module 90 delays injection of fuel during engine cranking until fuel pressure is greater than a predetermined fuel pressure and retards fuel injection until near top dead center (TDC). An exhaust cam phaser module 92 retards an exhaust cam phaser engine starting and oil pressure is greater than a predetermined oil pressure.

A spark control module 94 retards spark after the SIDI engine starts and oil pressure is greater than a predetermined oil pressure. An engine steady state module 96 transitions the exhaust cam phaser module, the spark control module and the fuel module to steady state control. For example only, the engine steady state module 96 may transition to steady state control after the accelerator pedal position is greater than a predetermined pedal position. The engine steady state module 96 may transition to steady state control after the temperature is greater than a predetermined temperature. Other conditions or combinations of conditions may be used.

Figure 3:
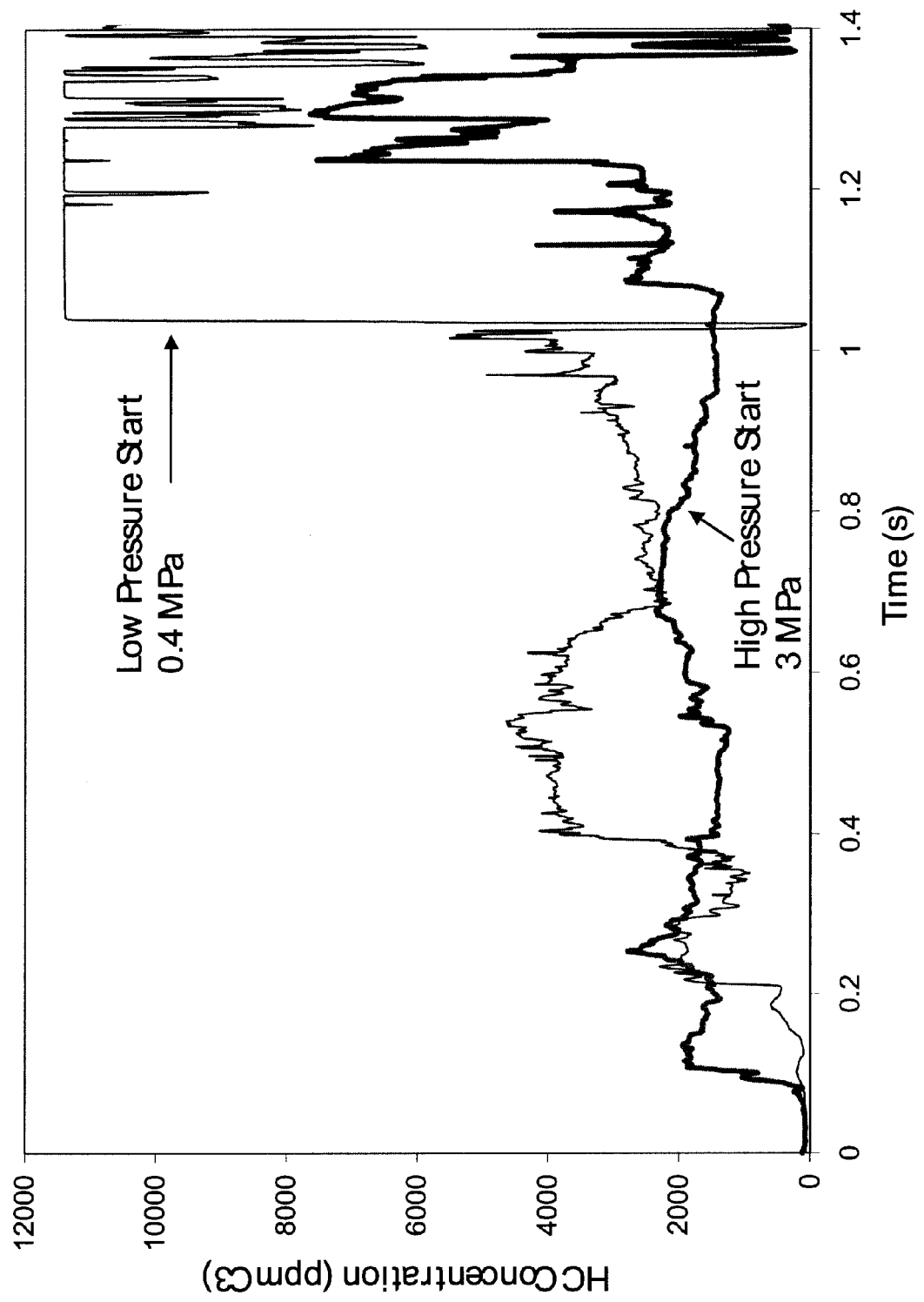
FIG. 3 is a graph that shows hydrocarbon (HC) concentration as a function of time during starting for different fuel pump pressures.

Referring now to FIG. 3, a graph illustrates reduced HC concentration according to the present disclosure. When fuel is delivered at low pressure (for example only, at 0.4 M Pascals (Pa)) during a start, significantly higher HC concentration occurs as compared to starting at higher pressures according to the present disclosure.

Figure 4:
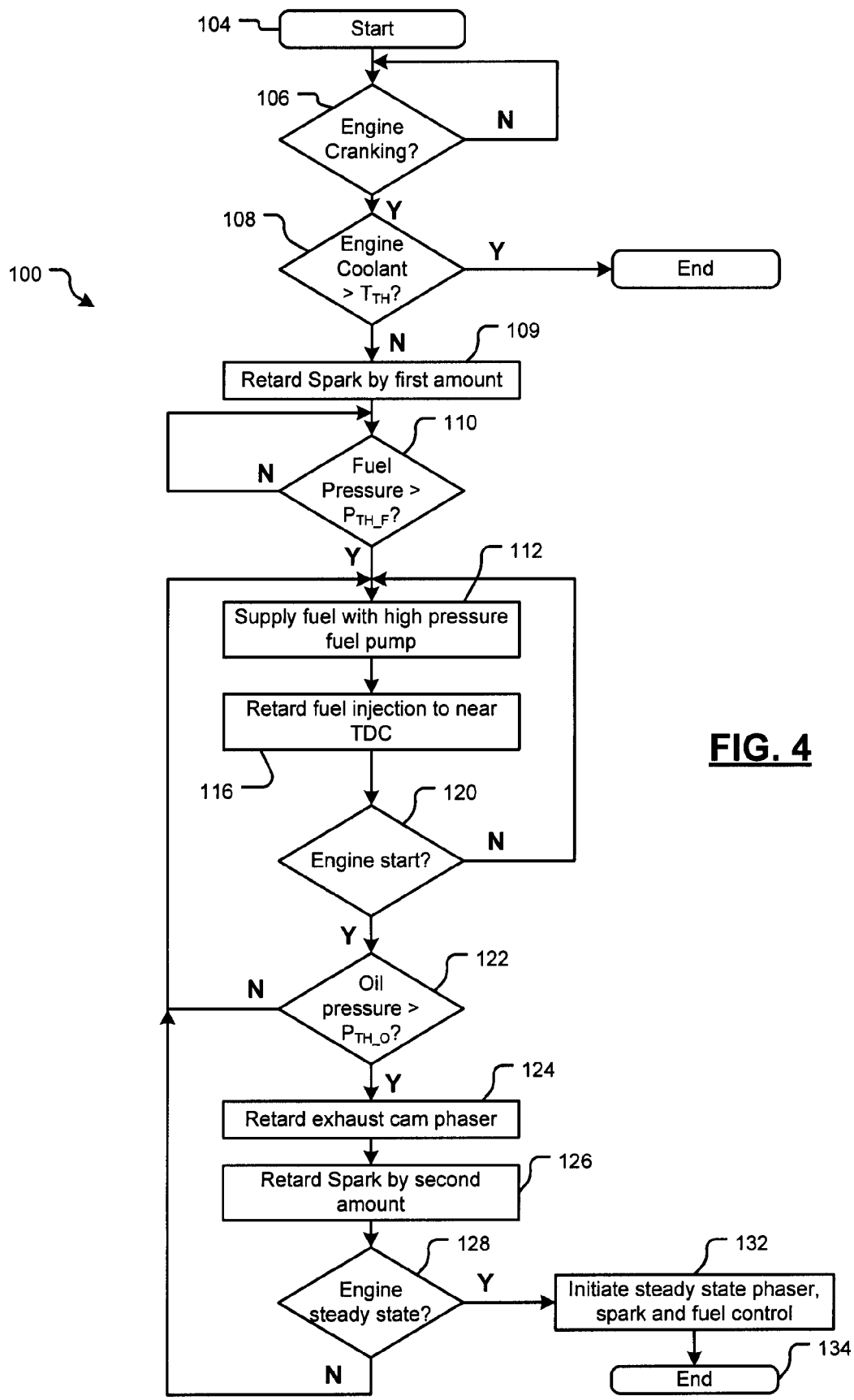
FIG. 4 illustrates a method for starting a SIDI engine using high pressure fuel to reduce hydrocarbon emissions according to the present disclosure.

Referring now to FIG. 4, a method 100 according to the present disclosure for reducing HC emission during starting of the SIDI engine is shown. The method begins with step 104. In step 106, control determines whether the engine is cranking. When step 106 is true, control continues with step 108 and determines whether the engine coolant temperature is greater than a predetermined coolant temperature threshold TTH.

For example only, the coolant temperature threshold may be set equal to 40° C., although other coolant temperature values may be used. When the coolant temperature is greater than the predetermined coolant temperature threshold, it is likely that the engine was previously running and is still warm. Under these conditions, HC emission may be less problematic.

If step 108 is false, control continues with step 109 and retards spark by a first amount. For example only, the first amount may be retarded up to 10 degrees after TDC. Control continues with step 110 and determines whether the fuel pressure is greater than a predetermined fuel pressure threshold $P_{TH\_F}$. If step 110 is false, control returns to step 110. If step 110 is true, control continues with step 112. In step 112, control supplies fuel at a high pressure. As used herein, the predetermined fuel pressure threshold $P_{TH\_F}$ may be a value between 2-15 M Pascals (Pa). For example only, the predetermined fuel pressure threshold $P_{TH\_F}$ may be a value of approximately 2.5 to 3.5 MPa. For example only, the predetermined fuel pressure threshold $P_{TH\_F}$ may be approximately 3.0 MPa as shown in FIG. 3.

In step 116, control retards fuel injection into a point near TDC. As used herein, near TDC may include a range between 60 degrees before TDC to 0 before TDC. In step 120, control determines whether the engine has started. If step 120 is false, control returns to step 112. If step 120 is true, control continues with step 122 and determines whether the oil pressure is greater than a predetermined oil pressure threshold $P_{TH\_O}$. For example only, the predetermined oil pressure threshold $P_{TH\_O}$ may be equal to about 30 psi. Reaching the predetermined oil pressure threshold $P_{TH\_O}$ may typically take approximately 1-4 full revolutions of the SIDI engine. Therefore, an alternate approach may involve monitoring engine rotation.

If step 122 is false, control returns to step 112. If step 122 is true, control continues with step 124 and retards the exhaust cam phaser. For example only, the exhaust cam phaser may be retarded between 12-24 cam angle degrees. In step 126, control retards spark. For example only, spark may be retarded by a second amount that is greater than the first amount. For example only, the second amount can be approximately 15-25 degrees after TDC.

In step 128, control determines whether the SIDI engine has reached steady-state. For example only, the steady-state determination may be made based on catalyst temperature. For example only, the engine may be in steady state when the catalyst temperature has exceeded a predetermined catalyst temperature. Other criteria may include accelerator pedal position. For example only, the SIDI engine may be in steady state when the accelerator pedal position is greater than a predetermined position. Other conditions or combinations of conditions may be used.

If step 128 is true, control continues with step 132 and initiates steady-state control of exhaust cam phaser position, spark and fuel injection control. Control ends in step 134. If step 128 is false, control returns to step 112.

The present invention reduces cold start emission for several reasons. The present invention creates fuel stratification inside the cylinder that enables the SIDI engine to fire with an overall lean air fuel ratio (AFR) while maintaining a relatively rich AFR close to the spark plug starting from the very first engine firing event. Globally lean AFR during crank and run-up can significantly reduce engine-out HC during startup. The lean misfire limit of the engine will also be much leaner compared to regular fuel injection strategies due to the availability of a rich fuel mixture close to the spark plug region.

The present disclosure also minimizes the AFR variation due to volatility variations with different types of fuels. For a given amount of time and temperature, different types of liquid fuels will evaporate at different rates, which results in different available fuel vapor mass that can contribute to combustion. Because the in-cylinder gas temperature is very high, as high as 400 degrees Celsius close to TDC, all of the injected liquid fuel will vaporize and contribute to combustion regardless of fuel type.

In addition, the present disclosure enables more spark retard. When the injection timing is properly phased, there will be locally rich region near the spark plug that would enable late spark retard without misfire. Spark retard tends to reduce HC emission because it minimizes peak cylinder pressure, which means there is less HC in the cylinder crevices. Spark retard also produces more sensible exhaust heat, which can help catalyst warm-up.

The present disclosure delays the fuel injection until the desired high fuel pressure is reached. For example only, the delay may be approximately 0.5 s. About 50% of crank HC can be reduced with this strategy compared to regular (such as early and low pressure injection) strategies.

Once the oil pressure is built-up, the exhaust cam phaser is moved to a retarded position to further reduce engine out emission. Retarding the exhaust cam phaser improves the HC emission for several reasons. Retarding the exhaust cam phaser provides additional time for the combustion to progress in the cylinder before the exhaust valve is open and quenches the flame. This in turn will allow for additional spark retard, which will improve HC emission performance as described above. Retarding the exhaust cam phaser retains more burned residual gas, which contains some HC to be re-oxidized.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system for a spark-ignition direct-injection (SIDI) engine, comprising:
    a fuel module that delays injection of fuel during engine cranking until fuel pressure is greater than a predetermined fuel pressure, that retards ignition timing and that retards fuel injection until near top dead center (TDC); and
    an exhaust cam phaser module that retards an exhaust cam phaser after engine starting and oil pressure is greater than a predetermined oil pressure.

2. The engine control system of claim 1 further comprising a spark control module that retards spark after engine starting and oil pressure is greater than a predetermined oil pressure.

3. The engine control system of claim 2 wherein said spark control module retards spark between 15 and 25 degrees after TDC.

4. The engine control system of claim 2 further comprising an engine steady state module that transitions said exhaust cam phaser module, said spark control module and said fuel module to steady state control.

5. The engine control system of claim 4 further comprising a pedal position sensor that senses accelerator pedal position, wherein said engine steady state module transitions to steady state control after said accelerator pedal position is greater than a predetermined pedal position.

6. The engine control system of claim 4 further comprising a catalyst sensor that determines a temperature of a catalyst, wherein said engine steady state module transitions to steady state control after said catalyst temperature is greater than a predetermined temperature.

7. The engine control system of claim 1 wherein near TDC comprises a range between 60 degrees before TDC to 0 degrees before TDC.

8. The engine control system of claim 1 wherein said predetermined oil pressure is approximately 30 psi.

9. The engine control system of claim 1 wherein said exhaust cam phaser module retards said exhaust cam phaser between 12 and 24 cam angle degrees.

10. The engine control system of claim 1 wherein said predetermined fuel pressure is greater than 2 M Pascals.

11. A method for controlling a spark-ignition direct-injection (SIDI) engine, comprising:
    delaying injection of fuel during engine cranking until fuel pressure is greater than a predetermined fuel pressure;
    retarding ignition timing during engine cranking;
    retarding fuel injection until near top dead center (TDC); and
    retarding an exhaust cam phaser after engine starting and oil pressure is greater than a predetermined oil pressure.

12. The method of claim 11 further comprising retarding spark after engine starting and oil pressure is greater than a predetermined oil pressure.

13. The method of claim 12 wherein said retarding spark includes retarding spark between 15 and 25 degrees after TDC.

14. The method of claim 12 further comprising transitioning said exhaust cam phaser module, said spark control module and said fuel module to steady state control.

15. The method of claim 14 further comprising:
    sensing accelerator pedal position; and
    transitioning to steady state control after said accelerator pedal position is greater than a predetermined pedal position.

16. The method of claim 14 further comprising:
    determining a temperature of a catalyst, wherein said engine steady state module transitions to steady state control after said catalyst temperature is greater than a predetermined temperature.

17. The method of claim 11 wherein near TDC comprises a range between 60 degrees before TDC to 0 degrees before TDC.

18. The method of claim 11 wherein said predetermined oil pressure is approximately 30 psi.

19. The method of claim 11 wherein retarding said exhaust cam phaser includes retarding between 12 and 24 cam angle degrees.

20. The method of claim 11 wherein said predetermined fuel pressure is greater than 2 M Pascals.

* * * * *